(12) United States Patent
Mori et al.

(10) Patent No.: US 8,108,116 B2
(45) Date of Patent: Jan. 31, 2012

(54) VEHICLE BRAKE HYDRAULIC PRESSURE CONTROL SYSTEM

(75) Inventors: Ryoji Mori, Wako (JP); Atsushi Nakada, Wako (JP); Teppei Komori, Wako (JP); Susumu Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 903 days.

(21) Appl. No.: 12/129,111

(22) Filed: May 29, 2008

(65) Prior Publication Data

US 2008/0300763 A1    Dec. 4, 2008

(30) Foreign Application Priority Data

May 30, 2007    (JP) ................................. 2007-144026

(51) Int. Cl.
*B60T 13/00* (2006.01)

(52) U.S. Cl. ......... 701/70; 477/182; 303/11; 303/113.2; 303/113.4

(58) Field of Classification Search .................... 701/70; 477/205, 208, 182; 303/13, 10, 113.3, 113.1, 303/11, 113.2, 113.4; *B60T 13/00; G06F 19/00*
See application file for complete search history.

(56) References Cited

U.S. PATENT DOCUMENTS

| | | | | | |
|---|---|---|---|---|---|
| 5,586,814 | A * | 12/1996 | Steiner | ........................ | 303/116.2 |
| 6,322,164 | B1 * | 11/2001 | Sakamoto et al. | ......... | 303/115.4 |
| 6,345,869 | B1 * | 2/2002 | Matsuo et al. | ............. | 303/116.1 |
| 6,412,882 | B1 * | 7/2002 | Isono et al. | ................ | 303/114.1 |
| 6,425,644 | B2 * | 7/2002 | Kawahata et al. | ............ | 303/122 |
| 6,648,422 | B2 * | 11/2003 | Root et al. | ........................ | 303/7 |
| 6,945,610 | B1 * | 9/2005 | Mizutani et al. | ........... | 303/114.1 |
| 7,077,482 | B2 * | 7/2006 | Matsuno et al. | ........... | 303/114.1 |
| 7,445,298 | B2 * | 11/2008 | Niino et al. | ..................... | 303/11 |
| 7,472,011 | B2 * | 12/2008 | Fenske et al. | ................... | 701/70 |
| 7,527,339 | B2 * | 5/2009 | Iizuka et al. | .................... | 303/11 |
| 2004/0014565 | A1 * | 1/2004 | Oshima et al. | ................ | 477/182 |
| 2004/0162187 | A1 * | 8/2004 | Suzuki | ......................... | 477/182 |
| 2006/0183600 | A1 * | 8/2006 | Kamikado | .................... | 477/182 |
| 2007/0004557 | A1 * | 1/2007 | Steen et al. | .................... | 477/183 |
| 2007/0087898 | A1 * | 4/2007 | Anderson et al. | ............ | 477/182 |
| 2007/0159001 | A1 * | 7/2007 | Miyazaki et al. | .......... | 303/113.4 |
| 2007/0210642 | A1 * | 9/2007 | Niino et al. | ..................... | 303/11 |
| 2007/0210648 | A1 * | 9/2007 | Sato et al. | ..................... | 303/155 |
| 2007/0252428 | A1 * | 11/2007 | Okano et al. | ................ | 303/113.1 |
| 2008/0210499 | A1 * | 9/2008 | Isono et al. | ................... | 188/72.4 |

FOREIGN PATENT DOCUMENTS

| | | |
|---|---|---|
| EP | 1 449 731 | 8/2004 |
| EP | 1 671 864 | 6/2006 |
| JP | 2006-137221 | 6/2006 |
| JP | 2006-137382 | 6/2006 |

\* cited by examiner

*Primary Examiner* — Tuan C. To
(74) *Attorney, Agent, or Firm* — Rankin, Hill & Clark LLP

(57) ABSTRACT

A controller includes a target fluid amount calculation module 31 which obtains target fluid amounts for wheel brakes based on target hydraulic pressures which are set in a target wheel brake pressure setting module 30, an actual fluid amount calculation module 32 which obtains actual fluid amounts for the wheel brakes based on hydraulic pressures brake hydraulic pressure detectors, and a target flow rate calculation unit 34 which obtains target flow rates for the wheel brakes based on the actual fluid amounts obtained in the actual fluid amount calculation module 32 and controls the operation of a hydraulic pressure control unit based on the target flow rates obtained in the target flow rate calculation unit 34.

7 Claims, 17 Drawing Sheets

(FIG. 2 CONTINUED)
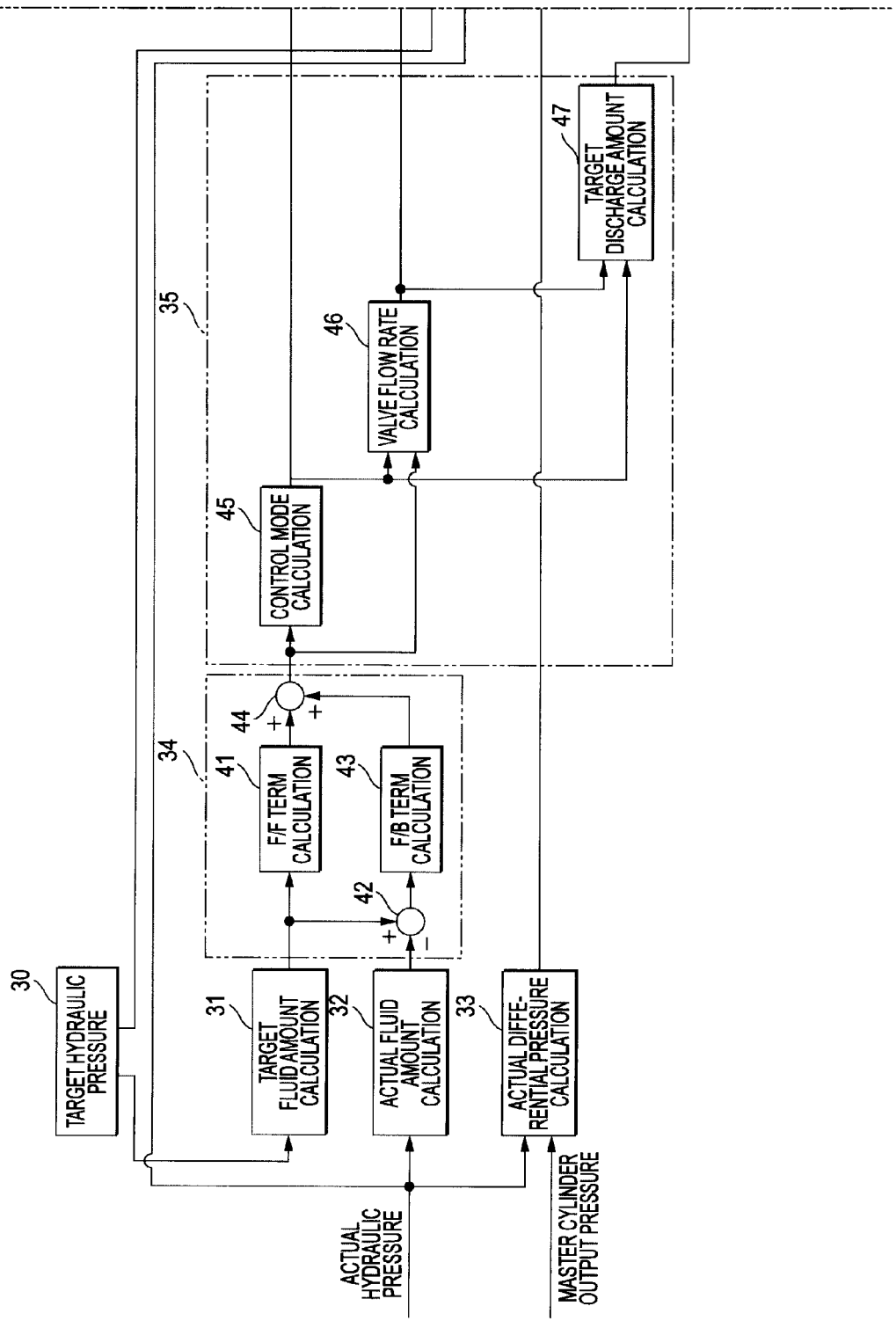

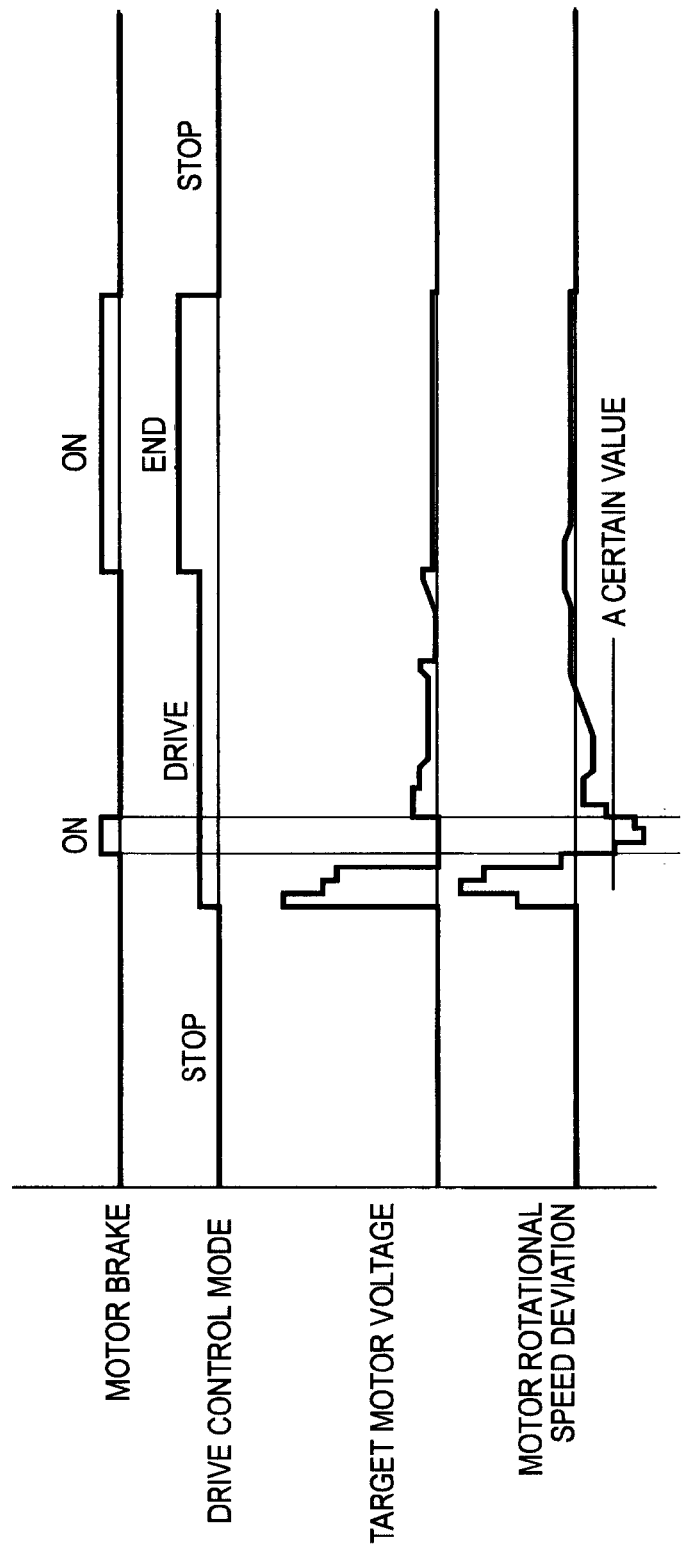

VEHICLE BRAKE HYDRAULIC PRESSURE CONTROL SYSTEM

BACKGROUND OF THE INVENTION

1. Field of the Invention

The present invention relates to a vehicle brake hydraulic pressure control system including a hydraulic pressure supply source which outputs hydraulic pressure, a hydraulic pressure control unit which is interposed between the hydraulic pressure supply source and wheel brakes for adjusting hydraulic pressures at the wheel brakes, a brake hydraulic pressure detecting unit which detects hydraulic pressures at the wheel brakes, and a controller which includes a target wheel brake pressure setting unit which sets target hydraulic pressures for the wheel brakes for controlling the operation of the hydraulic pressure control unit so that the hydraulic pressures at the wheel brakes become target hydraulic pressures set by the target wheel brake pressure setting unit.

2. Description of Related Art

A vehicle brake hydraulic pressure control system like this has already been known in, for example, Japanese Patent Unexamined Publication No. JP-A-2006-137382.

Conventionally, in controlling hydraulic pressures at wheel brakes of a vehicle, it is general practice to determine in advance target hydraulic pressures for the wheel brakes, pressure reducing thresholds which are higher than the target hydraulic pressures and pressure build-up thresholds which are lower than the target hydraulic pressures and compare brake pressures at the wheel brakes which are detected with the target hydraulic pressures, the pressure reducing thresholds and the pressure build-up thresholds to determine "pressure reduction," "pressure holding," and "pressure build-up."

As this occurs, as shown in FIG. 16A, when the pressure reducing thresholds and pressure build-up thresholds are made to approach the target hydraulic pressures in order to enhance the control accuracy, the brake pressures at the wheel brakes go past the pressure reducing thresholds and the pressure build-up thresholds at one breath to produce an overshoot.

On the other hand, as shown in FIG. 16B, when the holding area is expanded by moving the pressure reducing thresholds and the pressure build-up thresholds away from the target hydraulic pressures, the control accuracy is deteriorated.

Therefore, according to the JP-A-2006-137382, although thresholds are prepared for use according to the control modes, when attempting to enhance the response of the lamps, the brake pressures change in a stepped fashion as shown in FIG. 16C, producing mode hunting.

SUMMARY OF THE INVENTION

The invention has been made in view of the situations, and an object thereof is to provide a vehicle brake hydraulic pressure control system which can realize compatibility of control accuracy and response of the control of hydraulic pressures at the wheel brakes by adopting a concept of flow rate control.

With a view to attaining the object, according to a first aspect of the invention, there is provided a vehicle brake hydraulic pressure control system including:

a hydraulic pressure supply source (M, 18) which outputs hydraulic pressure;

a hydraulic pressure control unit (5) which is interposed between the hydraulic pressure supply source (M, 18) and wheel brakes (BA, BB) and which adjusts hydraulic pressures at the wheel brakes (BA, BB);

a brake hydraulic pressure detecting unit which detects hydraulic pressures at the wheel brakes (BA, BB); and a controller (C) which includes a target wheel brake pressure setting unit (30) which sets target hydraulic pressures for the wheel brakes (BA, BB) and which controls an operation of the hydraulic pressure control unit (5) so that the hydraulic pressures at the wheel brakes (BA, BB) become target hydraulic pressures set by the target wheel brake pressure setting unit (30), wherein the controller (C) includes:

a target fluid amount calculation unit (31) which obtains target fluid amounts for the wheel brakes (BA, BB) based on the target hydraulic pressures set by the target wheel brake pressure setting unit (30);

an actual fluid amount calculation unit (32) which obtains actual fluid amounts for the wheel brakes (BA, BB) based on the hydraulic pressures detected by the brake hydraulic pressure detecting unit (23, 24), and a target flow rate calculation unit (34) which obtains target flow rates for the wheel brakes (BA, BB) based on the target fluid amounts obtained by the target fluid amounts calculation unit (31) and the actual fluid amounts obtained by the actual fluid amount calculation unit (32) and the controller controls the operation of the hydraulic pressure control unit (5) based on the target flow rates obtained by the target flow rate calculation unit (34).

According to a second aspect of the invention, there is provided a vehicle brake hydraulic pressure control system as set forth in the first aspect of the invention, wherein the hydraulic pressure control unit (5) is adapted to be controlled to switch to:

a pressure build-up mode for causing the hydraulic pressure of the hydraulic pressure supply source (M, 18) to be applied to the wheel brakes (BA, BB);

a pressure reducing mode for releasing the hydraulic pressures at the wheel brakes (BA, BB); and a pressure holding mode for holding the hydraulic pressures at the wheel brakes (BA, BB), and the controller (C) controls the operation of the hydraulic pressure control unit (5) by switching the operation mode thereof among the pressure build-up mode, the pressure reducing mode and the pressure holding mode based on signs and absolute values of the target flow rates obtained by the target flow rate calculation unit (34).

According to a third aspect of the invention, there is provided a vehicle brake hydraulic pressure control system as set forth in the first aspect of the invention, wherein the hydraulic pressure control unit (5) includes linear solenoid valves (7, 9, 10, 14, 15) which are current controlled, and the control unit (C) controls current applied to the linear solenoid valves (7, 9, 10, 14, 15) based on a difference between the hydraulic pressures detected by the brake hydraulic pressure detecting unit (23, 24) and the target hydraulic pressures set by the target brake pressure setting unit (30) and the target flow rate obtained by the target flow rate calculation unit (34).

According to a fourth aspect of the invention, there is provided a vehicle brake hydraulic pressure control system as set forth in the first aspect of the invention, wherein the hydraulic pressure supply source (18) is a pump which is driven by an electric motor (17), and the controller (C) includes:

a target discharge amount calculation unit (47) which obtains a target discharge amount for the pump (18) based on the target flow rates obtained by the target flow rate calculation unit (34); and a target rotational speed calculation unit (37) which obtains a target rotational speed for the electric motor (17) based on the target discharge amount obtained by the target discharge amount calculation unit (47) and the controller (C) controls the electric motor (17) based on the target rotational speed obtained by the target rotational speed calculation unit (37).

According to a fifth aspect of the invention, there is provided a vehicle brake hydraulic pressure control system as set forth in the second aspect of the invention, wherein the controller (C) includes:

a pressure build-up timer (57) which implements counting up normally except when a count value is cleared to "0" when the hydraulic pressure control unit (5) is controlled to shift from the pressure build-up mode to the pressure reducing mode or the pressure holding mode; and a pressure reducing timer (58) which implementing counting up normally except when a count value is cleared to "0" when the hydraulic pressure control unit (5) is controlled to shift from the pressure reducing mode to the pressure build-up mode or the pressure holding mode, and the controller (C) increases a controlled variable of the hydraulic pressure control unit (5) as a high select value of the count values of the pressure build-up timer (57) and the pressure reducing timer (58) increases.

Note that a master cylinder M and a pump 1 in an embodiment correspond to the hydraulic pressure source of the invention, a regulator valve 7, inlet valves 9, 10 and outlet valves 14, 15 of the embodiment correspond to the linear solenoid valves of the invention, and a left front wheel disc brake BA and a right rear disc brake BB of the embodiment correspond to the wheel brakes of the invention.

According to the first aspect of the invention, since the target flow rates for the wheel brakes are obtained by the target flow rate calculation unit based on the target fluid amounts for the wheel brakes obtained by the target fluid amount calculation unit based on the target hydraulic pressures set by the target wheel brake pressure setting unit and the actual fluid amounts of the wheel brakes obtained by the actual fluid amount calculation unit based on the hydraulic pressures detected by the brake hydraulic pressure detecting unit and the controller controls the operation of the hydraulic pressure control unit, the control accuracy and response of the control of hydraulic pressures at the wheel brakes can be enhanced. Namely, the response which is necessary in controlling the hydraulic pressures at the wheel brakes is a lamp response, and now that it is understood that while the lamps are in response, brake fluid continues to be inputted into or outputted from the wheel brakes, by controlling the hydraulic pressures at the wheel brakes based on such continuous input or output of brake fluid, the control accuracy and response can be enhanced.

According to the second aspect of the invention, by switching the control modes based on the signs and absolute values of the target flow rates, the actual hydraulic pressures can be changed in a linear manner with no direct reference to the magnitude of the actual and target hydraulic pressures, whereby the control accuracy can be made compatible with the response.

According to the third aspect of the invention, since the current applied to the linear solenoid valves is controlled based on the difference between the hydraulic pressures detected by the brake hydraulic pressure detecting unit and the target hydraulic pressures set by the target wheel brake pressure setting unit and the target flow rates obtained by the target flow rate calculation unit, controlled current can be obtained in association with changes in characteristics of the linear solenoid valves with flow rates, thereby making it possible to enhance the control performance.

According to the fourth aspect of the invention, since the target rotational speed is determined based on the target discharge amount obtained based on the target flow rates and the electric motor which drives the pump is controlled based on the target rotational speed, not only can the response and quietness in controlling hydraulic pressures be enhanced but also a further enhancement in hydraulic pressure control accuracy can be realized.

According to the fifth aspect of the invention, the generation of control hunting can be prevented.

BRIEF DESCRIPTION OF THE DRAWINGS

FIG. 15 is a timing charts which illustrates a state in which a motor brake of the electric motor is applied;

DETAILED DESCRIPTION OF THE PREFERRED EMBODIMENTS

Hereinafter, a mode for carrying out the invention will be described based on an embodiment of the invention which are illustrated in the accompanying drawings.

FIGS. 1 to 15 show one embodiment of the invention.

Figure 1:
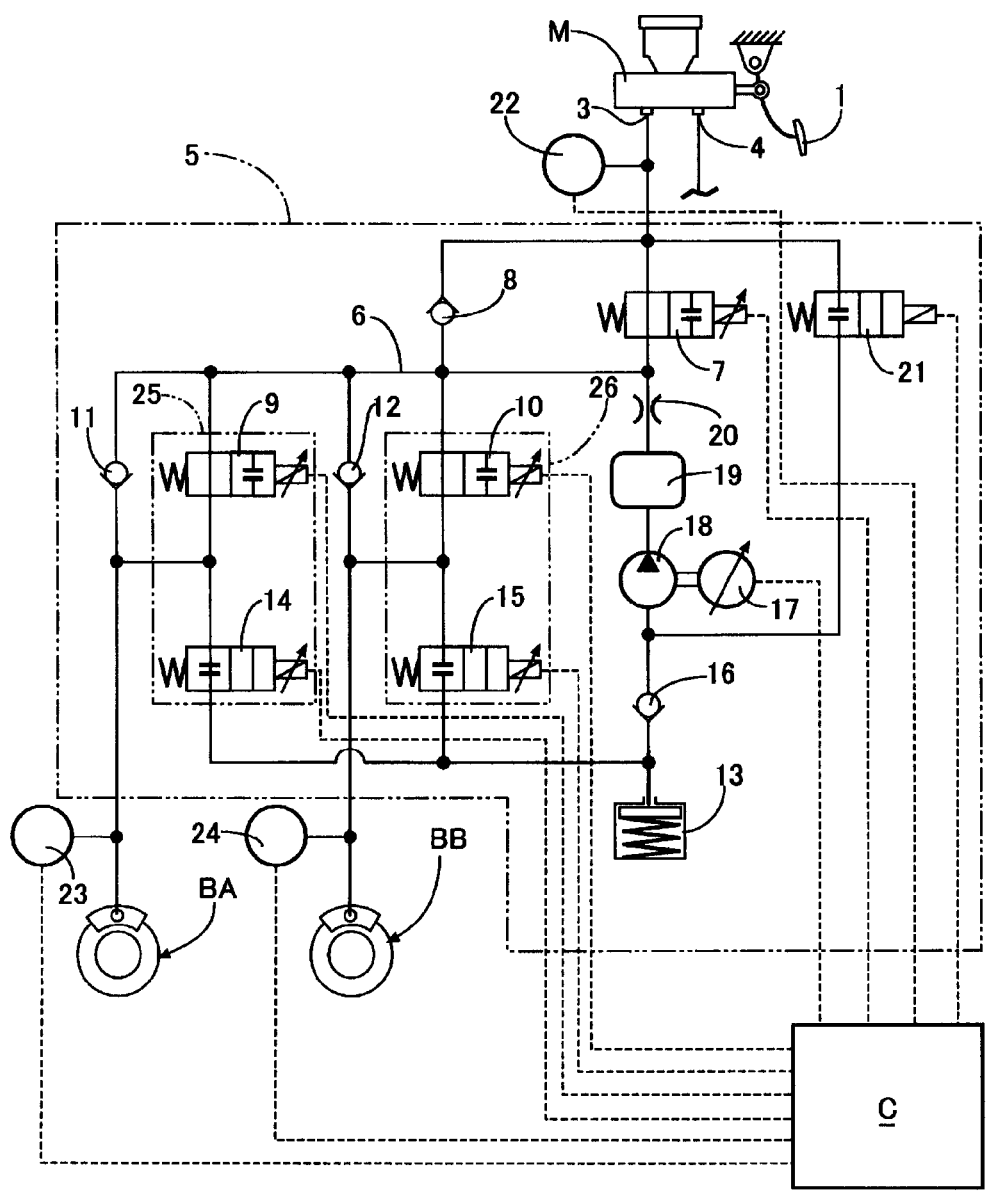
FIG. 1 is a hydraulic pressure system diagram showing the configuration of a vehicle brake hydraulic pressure control system.

Firstly, in FIG. 1, brake application effort produced by the operation of a brake pedal by the occupant of a vehicle is inputted into a master cylinder M which is a primary hydraulic pressure generating source which outputs a hydraulic pressure in accordance with the degree of operation of the brake pedal. The master cylinder M is configured into a tandem type one and includes a primary output port 3 which deals with a left front wheel disc brake BA and a right rear wheel disc brake BB which are wheel brakes and a secondary output port 4 which deals with a right front wheel disc brake (not shown) and a left rear wheel disc brake (not shown) which are wheel brakes, the primary and secondary output ports 3, 4 being connected to the respective disc brakes BA, BB, . . . via a hydraulic pressure control unit 5.

A section of the hydraulic pressure control unit 5 which deals with the primary output port 3 and a section which deals with the secondary output port 4 are such as to have the same configuration, and hence, hereinafter, only the section of the hydraulic pressure control unit 5 which deals with the primary output port 3 will be described, thus the description of the section of the hydraulic pressure control unit 5 which deals with the secondary output port 4 being omitted.

The hydraulic pressure control unit 5 includes:

a hydraulic pressure path 6 which is common to the left front wheel disc brake BA and the right rear wheel disc brake BB;

a regulator valve 7 which is provided to be interposed between the hydraulic pressure path 6 and the primary output port 3;

a one-way valve 8 which is provided parallel to the regulator valve 7 in such a manner as to permit a flow or passage of brake fluid to the hydraulic pressure path 6 side;

an inlet valve 9 which is provided to be interposed between the hydraulic pressure path 6 and the left front wheel disc brake BA;

an inlet valve 10 which is provided to be interposed between the hydraulic pressure path 6 and the right rear wheel disc brake BB;

one-way valves 11, 12 which are connected parallel, respectively, to the inlet valves 9, 10 in such a manner as to permit a flow of brake fluid to the hydraulic pressure path 6 side;

a single reservoir 13 which is common to the left front wheel disc brake BA and the right rear wheel disc brake BB;

an outlet valve 14 which is provided to be interposed between the left front wheel disc brake BA and the reservoir 13;

an outlet valve 15 which is provided to be interposed between the right rear wheel disc brake BB and the reservoir 13;

a pump 18 as a secondary hydraulic pressure supply source which is connected to the reservoir 13 via a one-way valve 16 on a suction side thereof;

a damper 19 which is connected to a discharge side of the pump;

an orifice 20 which is provided between the damper 19 and the hydraulic pressure path 6; and a suction valve 21 which is provided between an intermediate position between the suction side of the pump 18 and the one-way valve 16 and the primary output port 3.

The pump 18 is such as to be driven by an electric motor 17 whose rotational speed can be changed by changing a drive duty. This electric motor 17 is common to the section dealing with the primary output port 3 and the section dealing with the secondary output port 4 of the hydraulic pressure control unit 5.

The regulator valve 7 and the inlet valves 9, 10 are normally open linear solenoid valves, the outlet valves 14, 15 normally closed linear solenoid valves and the suction valve 21 a normally closed solenoid valve. A master cylinder output hydraulic pressure detector 22 is connected to an intermediate position between the primary output port 3 and the regulator valve 7 for detecting an output hydraulic pressure from the master cylinder M. Brake hydraulic pressure detectors 23, 24 are connected, respectively, to intermediate positions between the inlet valves 9, 10 and the left front wheel disc brake BA and the right rear wheel disc brake BB for detecting brake hydraulic pressures exerted, respectively, on the left front wheel disc brake BA and the right rear wheel disc brake BB.

Thus, the inlet valve 9 and the outlet valve 14 make up an operation mode switching valve module 25 for switching operation modes between:

a pressure build-up mode for establishing a connection between the hydraulic pressure path 6 and the left front wheel disc brake BA with the inlet valve 9 opened and the outlet valve 14 closed;

a pressure reducing mode for interrupting a connection between the left front wheel disc brake BA and the reservoir 13 while establishing a connection between the left front wheel disc brake BA and the reservoir 13 with the inlet valve 9 closed and the outlet valve 14 opened; and a pressure holding mode for disconnecting the hydraulic pressure path 6 and the reservoir 13 from the left front wheel disc brake BA with the inlet valve 9 and the outlet valve 14 both closed.

Therefore, in the pressure build-up mode, the hydraulic pressure in the hydraulic pressure path 6 is exerted on the left front wheel disc brake BA, in the pressure reducing mode, the hydraulic pressure at the left front wheel disc brake BA is released to the reservoir 13, and in the pressure holding mode, the hydraulic pressure at the left front wheel disc brake BA is held.

In addition, the inlet valve 10 and the outlet valve 15 make up an operation mode switching valve module 26 for switching operation modes between:

a pressure build-up mode for establishing a connection between the hydraulic pressure path 6 and the right rear wheel disc brake BB with the inlet valve 10 opened and the outlet valve 15 closed;

a pressure reducing mode for interrupting a connection between the right rear wheel disc brake BB and the reservoir 13 while establishing a connection between the right rear wheel disc brake BB and the reservoir 13 with the inlet valve 10 closed and the outlet valve 15 opened; and a pressure holding mode for disconnecting the hydraulic pressure path 6 and the reservoir 13 from the right rear wheel disc brake BB with the inlet valve 10 and the outlet valve 15 both closed.

Therefore, in the pressure build-up mode, the hydraulic pressure in the hydraulic pressure path 6 is exerted on the right rear wheel disc brake BB, in the pressure reducing mode, the hydraulic pressure at the right rear wheel disc brake BB is released to the reservoir 13, and in the pressure holding mode, the hydraulic pressure at the right rear wheel disc brake BB is held.

In the hydraulic pressure control unit 5 configured as has been described above, by activating the electric motor 17 to operate with the suction valve 21 energized to open, the pump 18 discharges brake fluid that it has taken in from the master cylinder M side and pressurized to a portion of the hydraulic pressure path 6 which lies between the regulator valve 7 and the inlet valves 9, 10. As this occurs, by controlling the operation of the regulator valve 7, the hydraulic pressure in the hydraulic pressure path 6 can be adjusted.

Namely, the pump 18 and the regulator valve 7 exert the adjusted hydraulic pressure to the hydraulic pressure path 6 when the brakes are not applied. By controlling the hydraulic pressure by the inlet valves 9, 10 and the outlet valves 14, 15 of the switching valve modules 25, 26, brake hydraulic pressures which are different from each other can be exerted on the left front wheel disc brake BA and the right rear wheel disc brake BB, thereby making it possible to effect a brake control such as a behavior stabilizing control or a traction control while the vehicle is running. As this occurs, the regulator valve 7 is controlled so that the hydraulic pressure in the hydraulic pressure path 6 becomes a value corresponding to the brake hydraulic pressure of the disc brake of the left front wheel disc brake BA and the right rear wheel disc brake BB for which a high hydraulic pressure is required. Moreover, in controlling the disc brake of the left front wheel disc brake BA and the right rear wheel disc brake BB for which the high hydraulic pressure is required, there may occur a case where switching between the pressure build-up mode, the pressure reducing mode and the pressure holding mode is effected by controlling the regulator valve 7 to open or close.

In addition, when the service brake is applied, the operation of the electric motor 7 is stopped and the suction valve 21 is closed while the regulator valve 7 is opened, and by effecting an anti-lock braking control in which of the switching valve modules 25, 26, the switching valve module is controlled which deals with the wheel which is liable to be put in a locked state when the service brake is applied, the service brake is applied with good efficiency without locking the wheel.

The regulator valve 7, the inlet valves 9, 10, the outlet valves 14, 15, the electric motor 7 and the suction valve 21 of the hydraulic pressure control unit 5 are such as to be controlled by a controller C, and detection values of the master cylinder output hydraulic pressure detector 22 and the brake hydraulic pressure detectors 23, 24 are inputted into the controller C.

Figure 2:
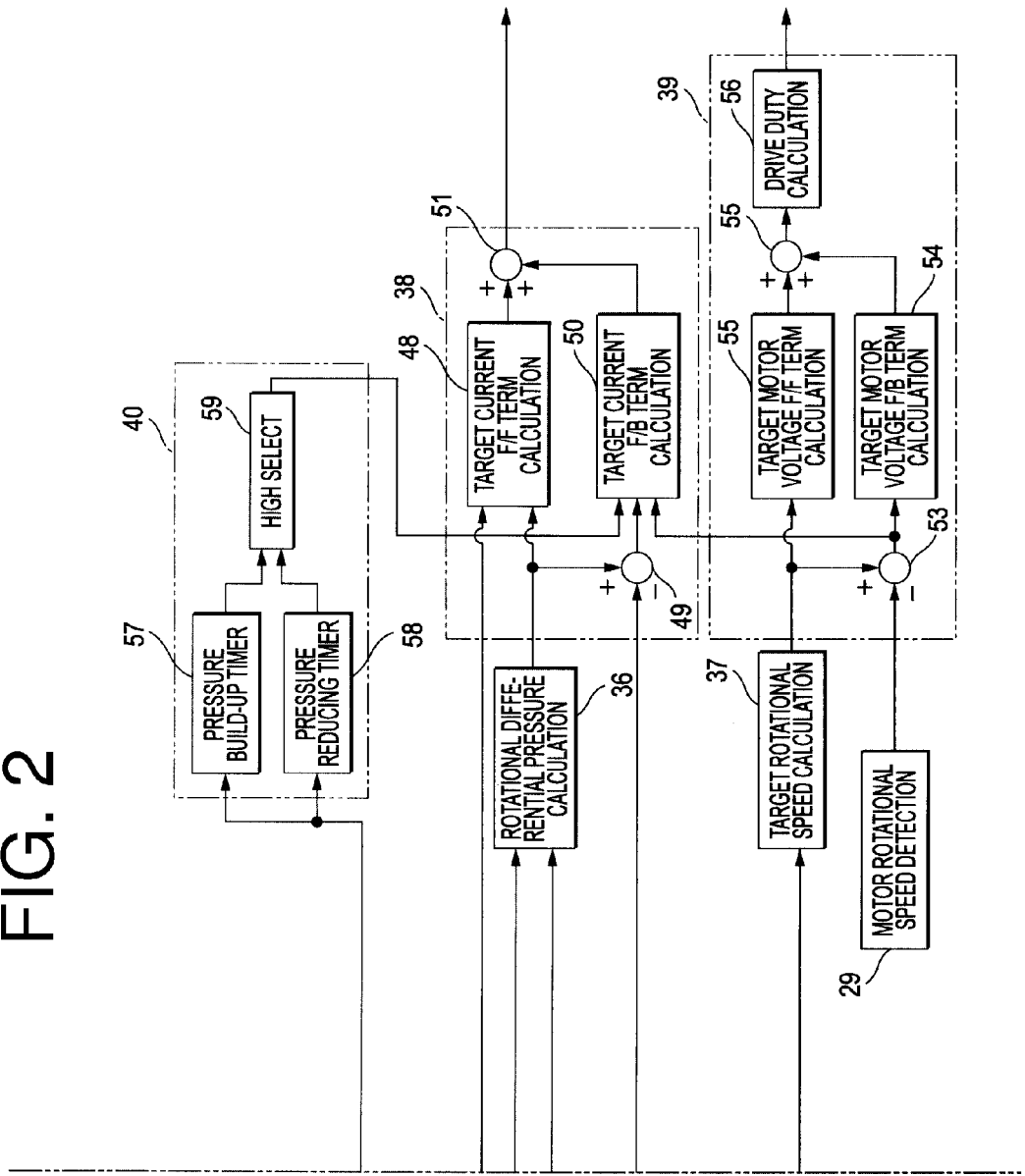
FIG. 2 is a block diagram showing a partial configuration of a controller.

In FIG. 2, a section in the controller C which is related to the left front wheel disc brake BA includes:

a target wheel brake pressure setting module 30 which sets a target hydraulic pressure for the left front wheel disc brake BA, a target fluid amount calculation module 31 which obtains a target fluid amount for the left front wheel brake BA based on the target hydraulic pressure set by the target wheel brake pressure setting module 30, an actual fluid amount calculation module 32 which obtains an actual fluid amount of the left front wheel brake disc BA based on a hydraulic pressure detected by the brake hydraulic pressure detector 23, an actual differential pressure calculation module 33 which calculates a differential pressure between before and after the control target valve of the regulator valve 7, the inlet valve 9 and the outlet valve 14 of the hydraulic pressure control unit 5, a target flow rate calculation unit 34 which obtains a target flow rate for the left front wheel disc brake BA based on the target fluid amount obtained by the target fluid amount calculation module 31 and the actual fluid amount obtained by the actual fluid amount calculation module 32, a hydraulic pressure control unit target controlled variable setting unit 35 which determines an operation amount of the hydraulic pressure control unit 5 as well as determining the control mode of the hydraulic pressure control unit 5 based on the results of operation in the target flow rate calculation unit 34, a target differential pressure calculation module 36 which calculates a difference between the target hydraulic pressure determined by the target wheel brake pressure module 30 and the actual hydraulic pressure, a target rotational speed calculation module 37 which calculates a target rotational speed for the pump 18 based on the results of operation in the target controlled variable setting unit 35, a control current calculation unit 38 which calculates a control current that is to be applied to the control target valve of the hydraulic pressure control unit 5 based on the results of operation in the hydraulic pressure control unit target controlled variable setting unit 35, a drive duty calculation unit 39 which calculates a drive duty for the electric motor 17 based the results of operation in the target rotational speed calculation module 37 and an actual motor rotational speed detected by a motor rotational speed detecting module 29, and a timer unit 40 which measures the amount of time taken based on the control mode of the hydraulic pressure control unit 5 which is determined by the hydraulic pressure control unit target controlled variable setting unit 35.

Figure 3:
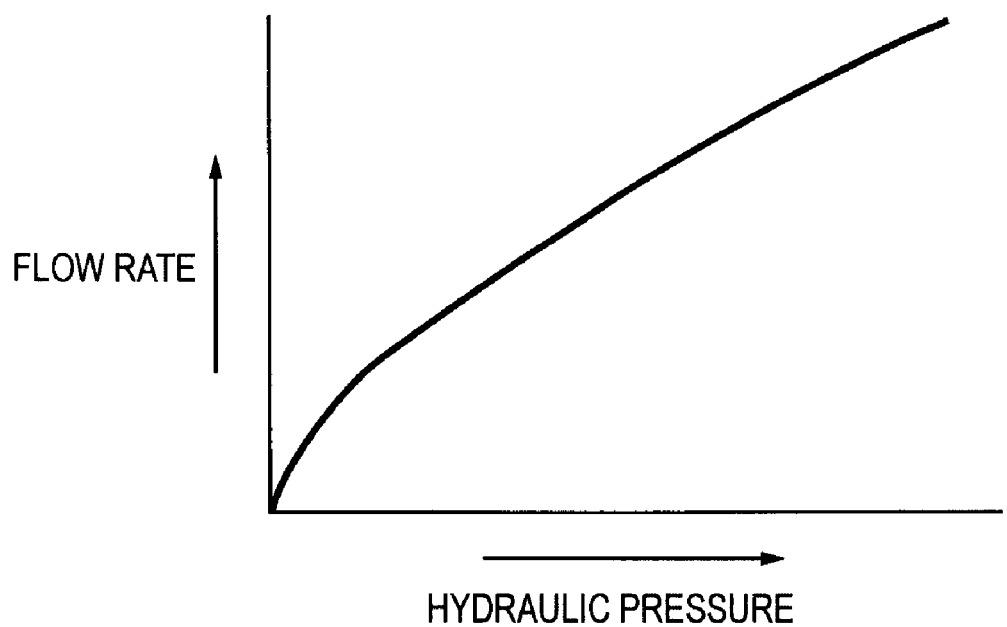
FIG. 3 is a diagram showing a relationship between hydraulic pressure and fluid amount.

The target fluid amount calculation module 31 and the actual fluid amount calculation module 32 calculate fluid amounts according to hydraulic pressures by following a preset map as shown in FIG. 3. In addition, the actual differential pressure calculation module 33 is such as to detect a differential pressure between before and after each of the regulator valve 7, the inlet valve 9 and the outlet valve 14 of the hydraulic pressure control unit 5, and when the hydraulic pressure in the hydraulic pressure path 6 is adjusted by the regulator valve 7 while keeping the inlet valve 9 and the outlet valve 14 opened and closed, respectively, the output hydraulic pressure of the master cylinder M which is detected by the master cylinder output hydraulic pressure detector 22 and the higher hydraulic pressure of the brake hydraulic pressures of the left front wheel disc brake BA and the right rear wheel disc brake BB which are detected by the brake hydraulic pressure detectors 23, 24 are inputted into the actual differential pressure calculation module 33, and the actual differential pressure calculation module 33 calculates an actual differential pressure between before and after the regulator valve 7. In addition, when the inlet valve 9 and the outlet valve 14 are controlled to open or close while keeping the regulator valve 7 opened, the output hydraulic pressure of the master cylinder M which is detected by the master cylinder output hydraulic pressure detector 22 and the brake hydraulic pressure of the left front wheel disc brake BA which is detected by the brake hydraulic pressure detector 23 are inputted into the actual differential pressure calculation module 33, and the actual differential pressure calculation module 33 calculates an actual differential pressure between before and after each of the inlet valve 9 and the outlet valve 14.

In FIG. 2, the target flow rate calculation unit 34 includes:

an F/F term calculation module 41 which obtains a feedforward (F/F) term by differentiating the target fluid amount obtained by the target fluid amount calculation module 31, a summing point 42 where the actual fluid amount obtained by the actual fluid amount calculation module 32 is subtracted from the target fluid amount obtained by the target fluid amount calculation module 31, an F/B term calculation module 43 which calculates a feedback (F/B) term from the differential fluid amount (the target fluid amount—the actual fluid amount) obtained in the summing point 42, and a summing point 44 where the F/B term obtained in the F/B term calculation module 43 to the F/F term obtained in the F/F term calculation module 41.

According to the target flow rate calculation unit 34, the target flow rate for the left front wheel disc brake BA is outputted from the summing point 44.

The hydraulic pressure control unit target controlled variable setting unit 35 includes:

a control mode calculation module 45 which determines the control mode of the hydraulic pressure control unit 5 by the target flow rate which is inputted from the target flow rate calculation unit 34, a valve flow rate calculation module 46 which calculates a target valve flow rate for the regulator valve 7, the inlet valve 9 or the outlet valve 14 based on the target flow rate inputted from the target flow rare calculation unit 34 and the control mode determined in the control mode calculation module 45, and a target discharge amount calculation module 47 which calculates a target discharge amount for the pump 18 based on the control mode determined in the control mode calculation module 45 and the flow rate operated in the valve flow rate calculation module 46.

Thus, the control mode calculation module 45 switches the control mode to the pressure build-up mode, the pressure reducing mode or to the pressure holding mode based on the sign and absolute value of the target flow rate obtained in the target flow rate calculation unit 34.

Figure 4A:
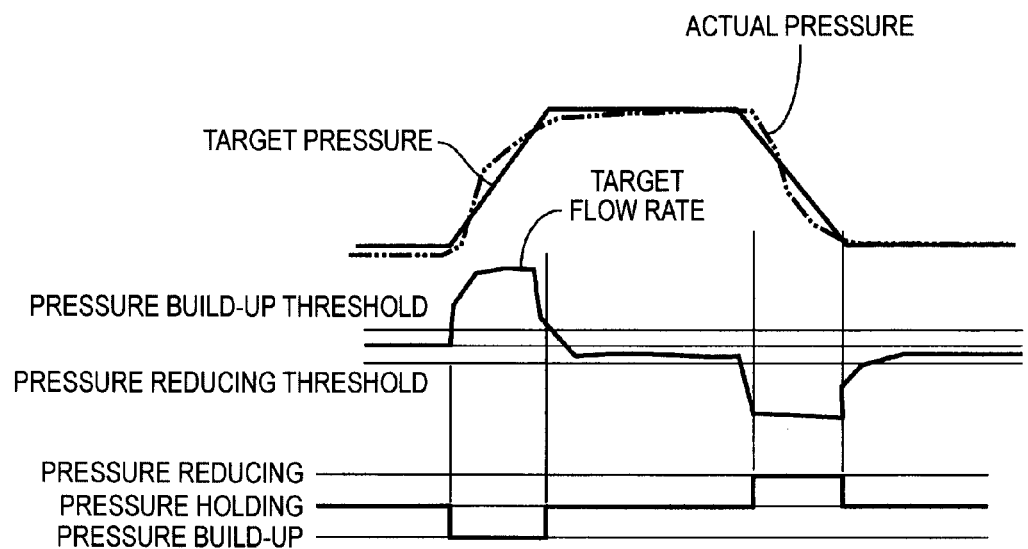
FIG. 4A is a timing chart which explains a control mode determination according to the present invention.

As shown in FIG. 4A, when the target flow rate changes, when a positive side value of the target flow rate surpasses a pressure-build up threshold, the control mode is shifted to the pressure build-up mode, when the positive side value becomes equal to or less than the pressure build-up threshold, the control mode is shifted from the pressure build-up mode to the pressure holding mode, while when a negative side value of the target flow rate becomes less than a pressure reducing threshold, the control mode is shifted from the pressure reducing mode to the pressure holding mode, and when the negative side value of the target flow rate becomes equal to or more than the pressure reducing threshold, the control mode is shifted from the pressure reducing mode to the pressure holding mode.

Figure 4B:
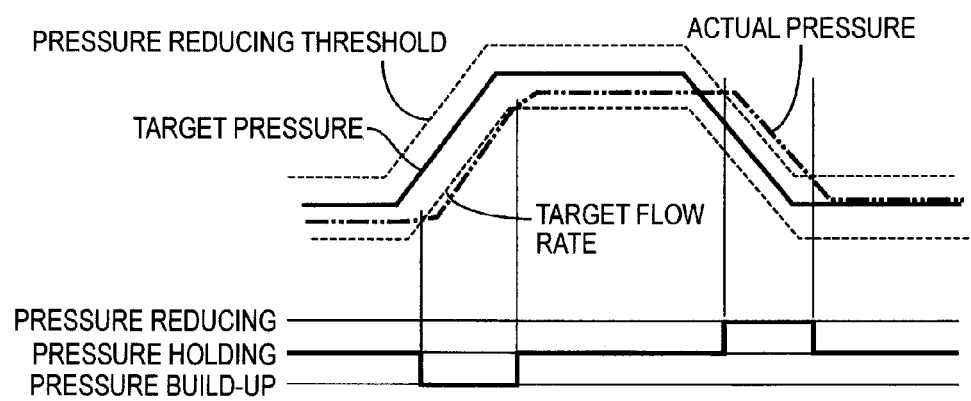
FIG. 4B is a timing chart which explains a control mode determination according to a conventional control.

In contrast to this, with the conventional one, as shown in FIG. 4B, the control mode is shifted to the pressure build-up mode in response to the actual pressure becoming less than the pressure build-up threshold which is set lower than the target pressure, the control mode is shifted from the pressure build-up mode to the pressure holding mode in response to the actual pressure becoming equal to or more than the pressure build-up threshold, the control mode is shifted from the pressure holding mode to the pressure reducing mode in response to the actual pressure surpassing the pressure reducing threshold which is set higher than the target pressure, and furthermore, the control mode is shifted from the pressure reducing mode to the pressure holding mode in response to the actual pressure becoming equal to or less than the pressure reducing threshold.

Incidentally, according to the conventional control mode switching based on the actual pressure, although the problem is caused which has been described in relation to FIG. 16, according to the control mode switching based on the sign and absolute value of the target flow rate, as shown in FIG. 4A, the actual pressure can be changed in a linear manner with no direct reference to the magnitude of the actual and target hydraulic pressures, whereby the control accuracy can be made compatible with the response.

In FIG. 2, the control current calculation unit 38 includes:

a target current F/F term calculation module 48 which calculates a target current feedforward (F/F) term for the regulator valve 7, the inlet valve 9 or the outlet valve 14 based on the target valve flow rate obtained in the valve flow rate calculation module 46 of the hydraulic pressure control unit target controlled variable setting unit 35 and the target differential pressure obtained in the target differential pressure calculation module 36, a summing point 49 where the actual differential pressure obtained in the actual differential pressure calculation module 33 is subtracted from the target differential pressure obtained in the target differential pressure calculation module 36, a target current F/B term calculation module 50 which calculates a feedback (F/B) term of the target current based on the differential pressure deviation obtained in the summing point 49, and a summing point 51 which adds the F/B term obtained in the target current F/B term obtaining module 50 to the F/F term obtained in the target current F/F term calculation module 48.

The target current for the regulator valve 7, the inlet valve 9 or the outlet valve 14 is outputted from the summing point 51.

Figure 5A:
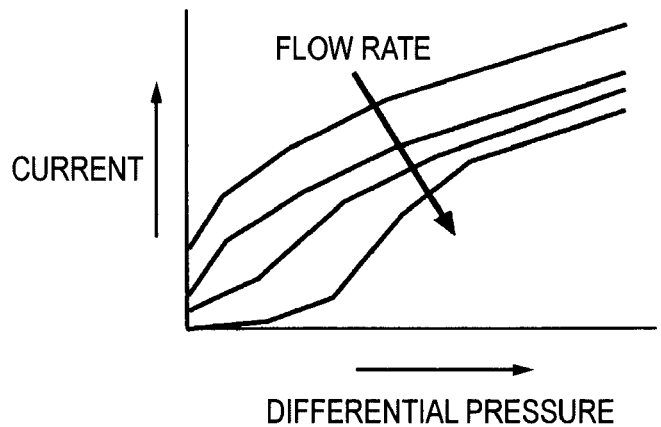
FIG. 5A is a diagram showing a map for determining current for an regulator valve 7 and an inlet valve 9 according to the present invention.
Figure 5B:
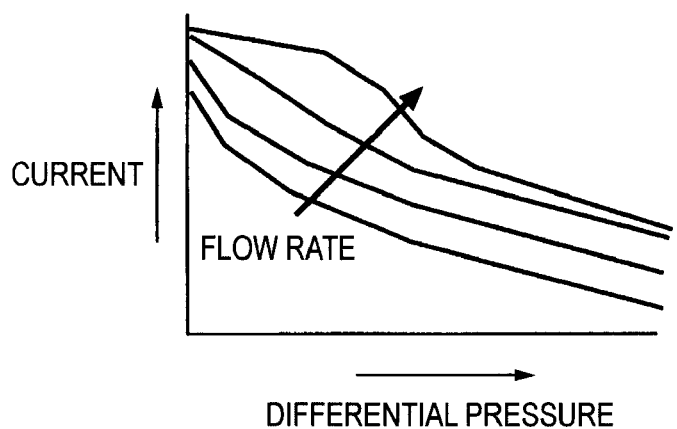
FIG. 5B is a diagram showing a map for determining current for an outlet valve 14 according to the present invention
Figure 5C:
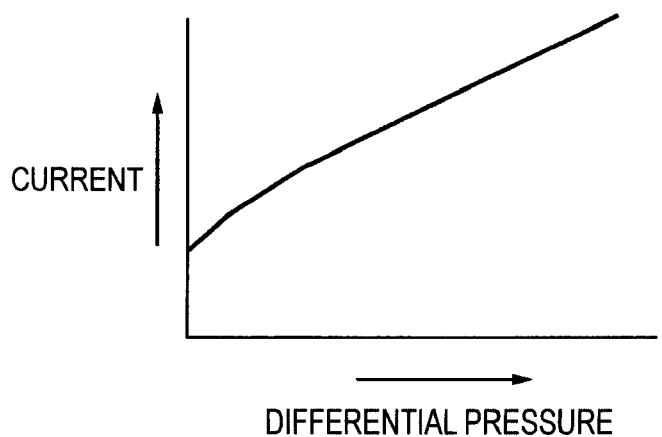
FIG. 5C is a diagram showing a map for determining current for linear solenoid valves according to the conventional control.

Incidentally, although the control current for controlling in a linear manner the regulator valve 7, the inlet valve 9 or the outlet valve 14, which is the linear solenoid valve, is in general made to be obtained through typical table searches for differential pressure—current characteristics shown in FIG. 5C which are associated with flow rate, the characteristics of the linear solenoid valve are such as to change with flow rate, and the response is affected largely by the F/F control. Then, the target current F/F term calculation module 48 is made to obtain a control current by following a pre set characteristic map of differential pressure—flow rate—current using the target valve flow rate obtained by the valve flow rate calculation module 46. The target current F/F term calculation module 48 obtains a control current for the regulator valve 7 and the inlet valve 9 by following a characteristic map of differential pressure—flow rate—current as shown in FIG. 5(a) in which with differential pressure remaining constant, current decreases as flow rate increases, and the target current F/F term calculation module 48 obtains a control current for the outlet valve 14 by following a characteristic map of differential pressure—flow rate—current as shown in FIG. 5(b) in which with the differential pressure remaining constant, current increases as flow rate increases.

In this way, the control current for the regulator valve 7, the inlet valve 9 or the outlet valve 14 is determined based on the difference between the hydraulic pressure detected in the brake hydraulic pressure detector 23 and the target pressure which is set in target wheel brake pressure setting module 30 and the target flow rate obtained in the target flow rate calculation unit 34, and the regulator valve 7, the inlet valve 9 or the outlet valve 14 is controlled in a linear manner by the control current so determined.

Figure 6A:
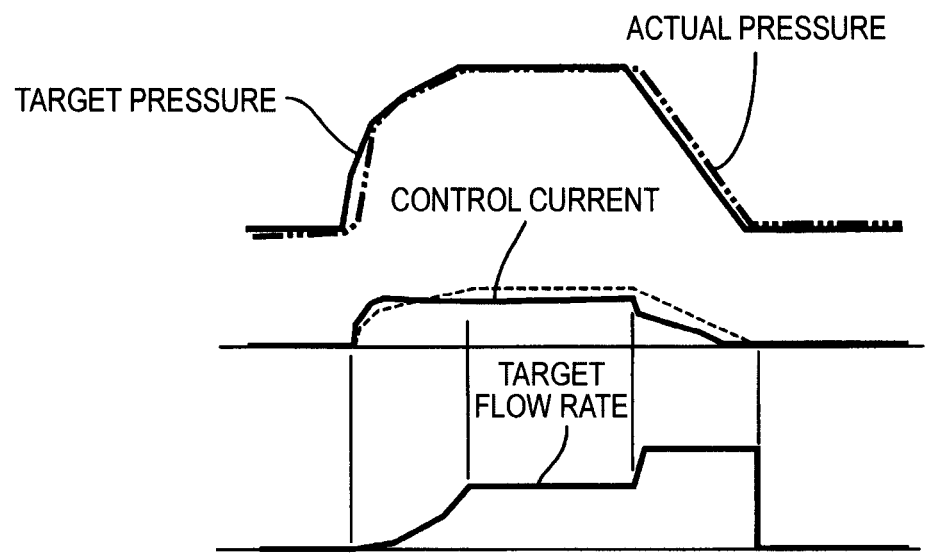
FIG. 6A is a diagram showing a timing chart which illustrates the follow-up capability of an actual pressure to a target pressure by a change in control current according to the present invention.
Figure 6B:
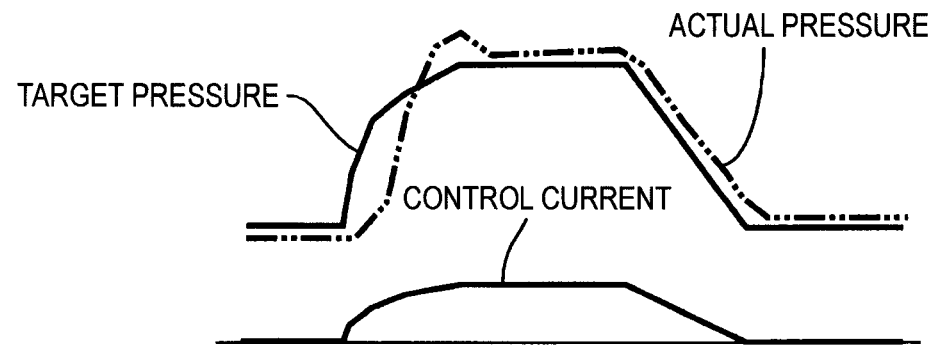
FIG. 6B is a diagram showing a timing chart which illustrates the follow-up capability of an actual pressure to a target pressure by a change in control current according to the conventional control.

Here, when the lamp response whose inclination changes is controlled, for example, by opening or closing the regulator valve 7, according to the conventional typical approach in which the control current is based on the flow rate, as shown in FIG. 6B, it is difficult to ensure that the actual pressure can be made to change appropriately with target pressure. However, in the event that the control current is made to change in accordance with a change in the target valve flow rate, as shown in FIG. 6A, the actual pressure can be made to change appropriately with target pressure, whereby the control performance is enhanced.

In FIG. 2, the target rotational speed calculation module 37 calculates a target rotational speed for the electric motor 17 based on the target discharge amount for the pump which is obtained in the target discharge amount calculation module 47 in the hydraulic pressure control unit target controlled variable setting unit 35.

The drive duty calculation unit 39 includes:

a target motor voltage F/F term calculation module 52 for calculating a target drive voltage feedforward (F/F) term for the electric motor 17 based on the target rotational speed obtained in the target rotational speed calculation module 37, a summing point 53 where the actual motor rotational speed which is the actual rotational speed of the electric motor 17 is subtracted from the target rotational speed obtained in the target rotational speed calculation module 37, a target motor voltage F/B term calculation module 54 for calculating a target drive voltage feedback (F/B) term for the electric motor 17 based on the rotational speed deviation obtained in the summing point 53, a summing point 55 where the F/B term obtained in the target motor voltage F/B term calculation module 54 is added to the F/F term obtained in the target motor voltage F/F term calculation module 52, and a drive duty calculation module 56 for calculating a drive duty based on the drive voltage obtained in the summing point 55, Therefore, the electric motor 17 is controlled by the drive duty obtained in the drive duty calculation module 56.

Figure 7:
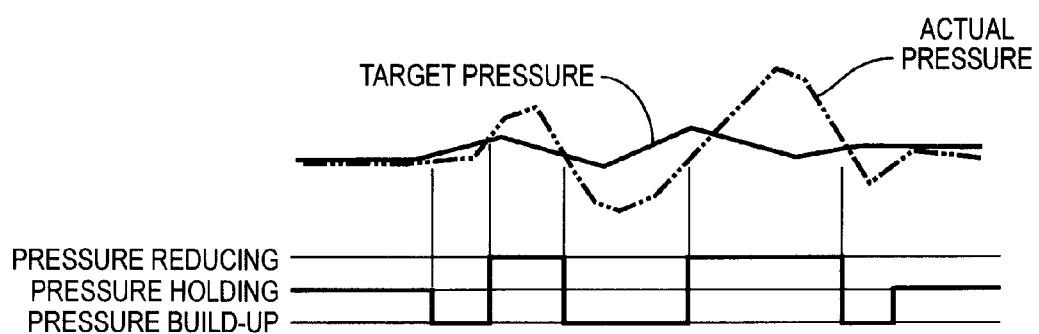
FIG. 7 is a diagram showing a state in which the actual pressure starts to vibrate in association with the target pressure starting to vibrate.

Incidentally, although response and high accuracy can be made compatible with each other by the hydraulic pressure control which introduces thereinto the concept of flow rate as has been described above, in the event that the target hydraulic pressure itself contains vibrations, as shown in FIG. 7, there may occur a case where vibrations are promoted by high accuracy on the contrary. In particular, when the pressure is built up or reduced using the switching valve modules 25, 26 which are made up of the inlet valves 9, 10 and the outlet valves 14, 15, respectively, since the inlet valves 9, 10 and the outlet valves 14, 15 are switched alternately to be opened or closed, vibrations are easy to be promoted. Then, in the event that vibrations are detected in the target hydraulic pressure, by changing a F/B gain in the operation in the target current F/B term calculation module 50 of the control current calculation unit 38, the vibrations can be reduced effectively.

Namely, the F/B gain in the operation in the target current F/B term calculation module 50 changes with the results of measuring the amount of time in the timer unit 40, and the timer unit 40 includes a pressure build-up timer 57 and a pressure reducing timer 58 which are adapted to count in response to a signal from the control mode calculation module 45 of the hydraulic pressure control unit target controlled variable setting unit and a high select module 59 for high selecting count values of the pressure build-up timer 57 and the pressure reducing timer 58.

The pressure build-up timer 57 implements counting up normally except when a count value is cleared to "0" when the hydraulic pressure control unit 5 is controlled to shift from the pressure build-up mode to the pressure reducing mode or to the pressure holding mode so as to obtain a count value TM_MDCAL_Z. The pressure reducing timer 58 implements counting up normally except when a count value is cleared to "0" when the hydraulic pressure control unit 5 is controlled to shift from the pressure reducing mode to the pressure build-up mode or to the pressure holding mode so as to obtain a count value TM_MDCAL_G. A high select value TM_MDCAL of those count values TM_MDCAL_Z and TM_MDCAL_G is obtained in the high select module 59.

Figure 8:
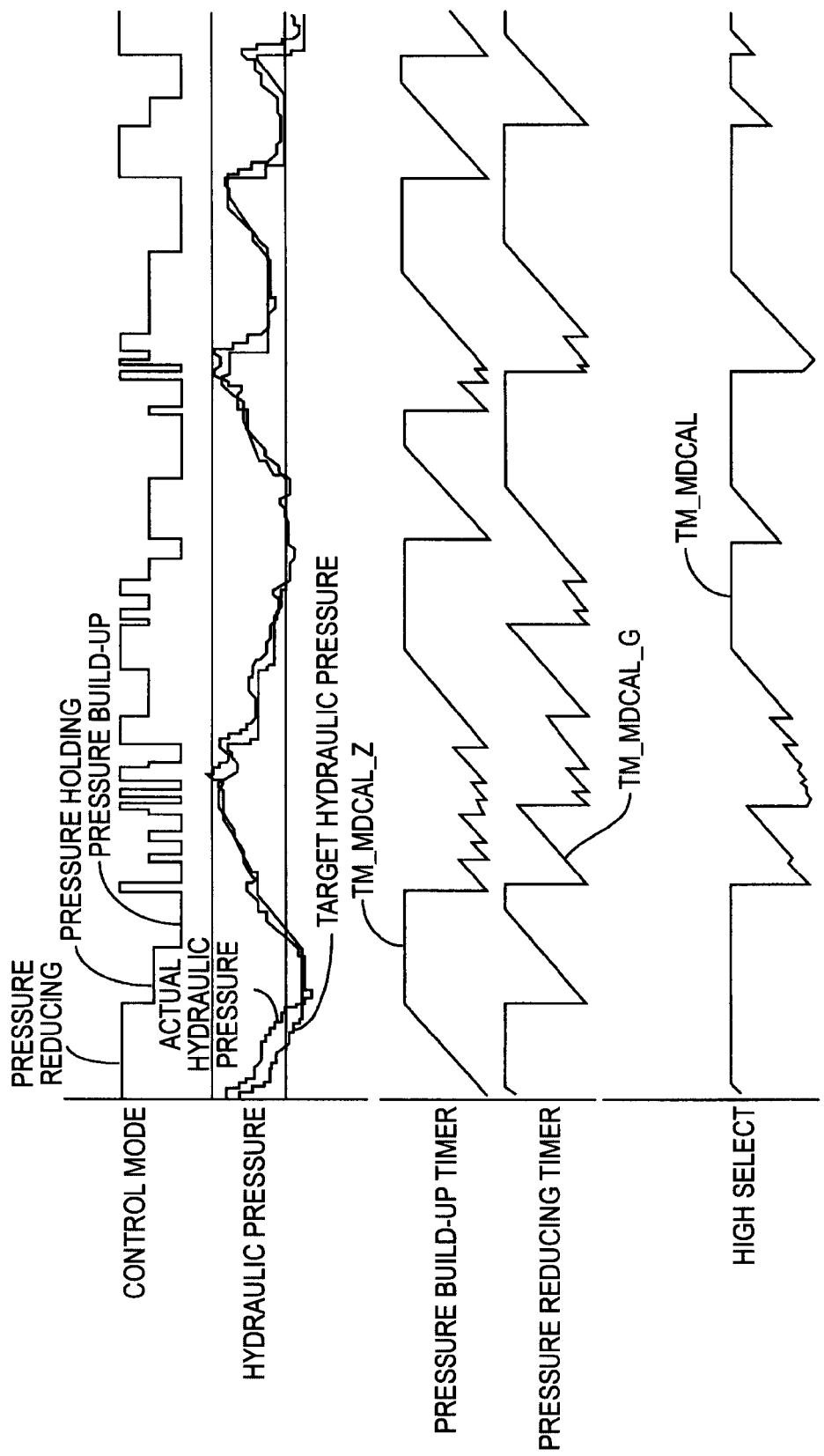
FIG. 8 is a timing chart which illustrates changes in control mode, target pressure, actual pressure and timer count values.

Thus, as shown in FIG. 8, it can be determined that no hunting is generated when the high select value TM_MDCAL is large, while when the high select value TM_MDCAL is small, hunting is generated.

Figure 9:
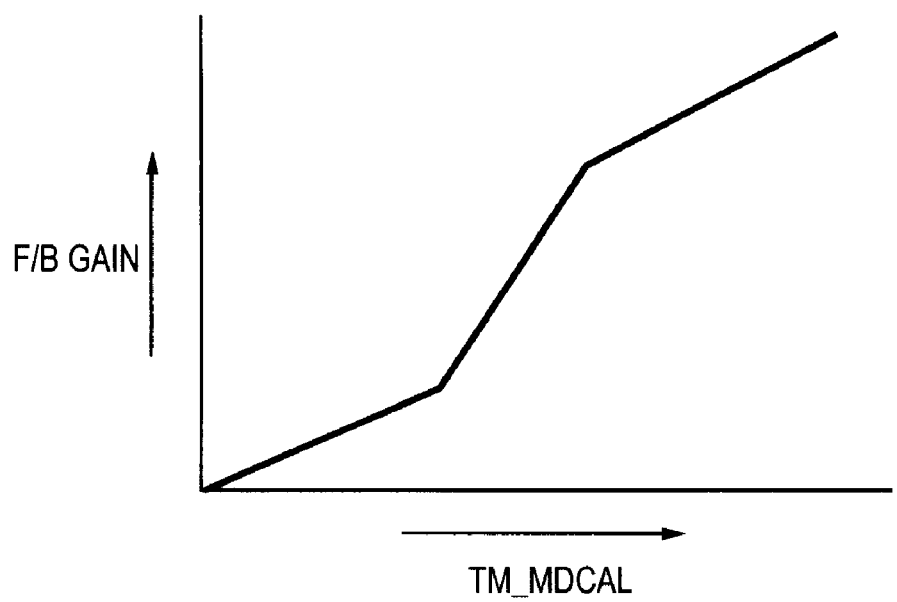
FIG. 9 is a diagram showing a change in F/B gain relative to a high select value.

Then, the high select value TM_MDCAL is inputted into the target current F/B term calculation module 50 of the control current calculation unit 38 from the high select module 59 of the timer unit 40, and in the target current F/B term calculation module 50, as shown in FIG. 9, the F/B gain changes in such a manner as to increase as the high select value TM_MDCAL increases. Namely, when hunting is liable to be generated, the controlled variable of the regulator valve 7, the inlet valves 9, 10 or the outlet valves 14, 15 is increased by increasing the F/B gain, whereby the hydraulic pressure control is enabled without promoting vibrations. Moreover, since the F/B gain is not such as to be switched depending upon the existence of hunting but such as to change continuously with change in the high select value TM_MDCAL, a smooth hydraulic pressure control can be realized, and robustness is enhanced.

Figure 10A:
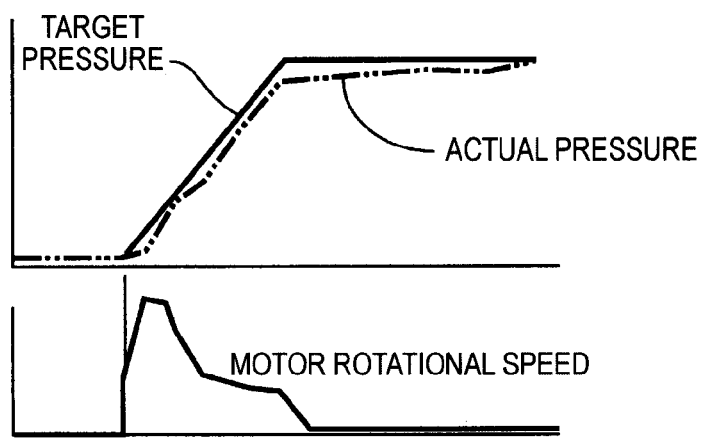
FIG. 10A is a diagram which illustrate the follow-up capability of the actual pressure to the target pressure by a change in rotational speed of an electric motor according to the present invention.
Figure 10B:
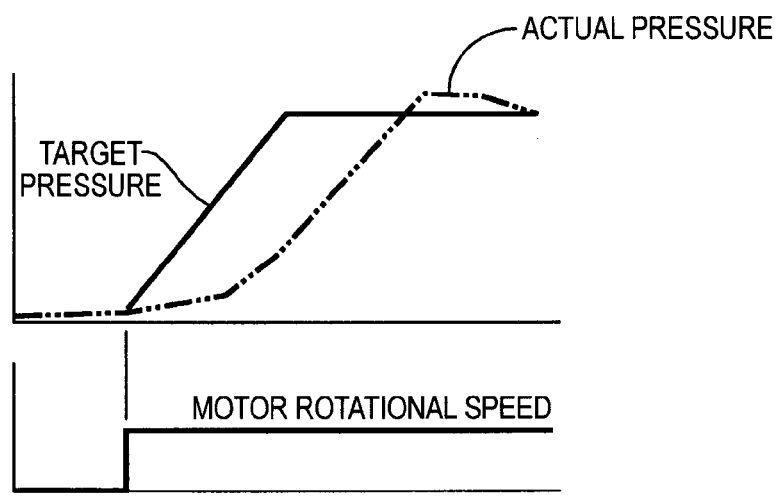
FIG. 10B is a diagram which illustrate the follow-up capability of the actual pressure to the target pressure by a change in rotational speed of an electric motor according to the conventional control.

Incidentally, operation noise and vibrations which are generated during the hydraulic pressure control are largely affected by the rotational speed of the electric motor 17 which drives the pump 18. Then, it has generally been performed that the rotational speed of the electric motor 17 is reduced in order to reduce the operation noise. However, although the operation noise is reduced by reducing the rotational speed of the electric motor 17, a pressurizing response is reduced as shown in FIG. 10B. However, since the target rotational speed calculation module 37 is such as to operate a target rotational speed for the electric motor 17 based on the target discharge mount of the pump 18 and the rotational speed of the electric motor 17 is controlled by operating the drive duty of the electric motor 17 by the drive duty calculation unit 39 based on the target rotational speed so operated, the response can be increased while maintaining quietness by reducing the operation noise, as shown in FIG. 10A. Moreover, optimizing the discharge amount of the pump 18 can contribute to increasing the hydraulic pressure control accuracy.

In addition, in a case where a self pressure build-up control is implemented by the regulator valve 7, when implementing a feedback by hydraulic pressure in order to increase the control accuracy, the F/B gain is required to be increased in order to increase the response and toughness against disturbance. However, the self pressure build-up is implemented by adjusting the hydraulic pressure discharged from the pump 18 by the regulator valve 7, and in such a state that the discharge amount from the pump 18 has not yet reached a predetermined value in an initial stage of the control, there is no case where the pressure build-up is improved even by feedback on the regulator valve 7 side. On the contrary, in the event that the F/B gain is increased as shown in FIG. 11B in such a state, since an excessive F/B gain is operated by a large hydraulic pressure deviation and an overshoot occurs when the discharge amount has reached the predetermined value, the F/B gain cannot be increased to become large.

Figure 11A:
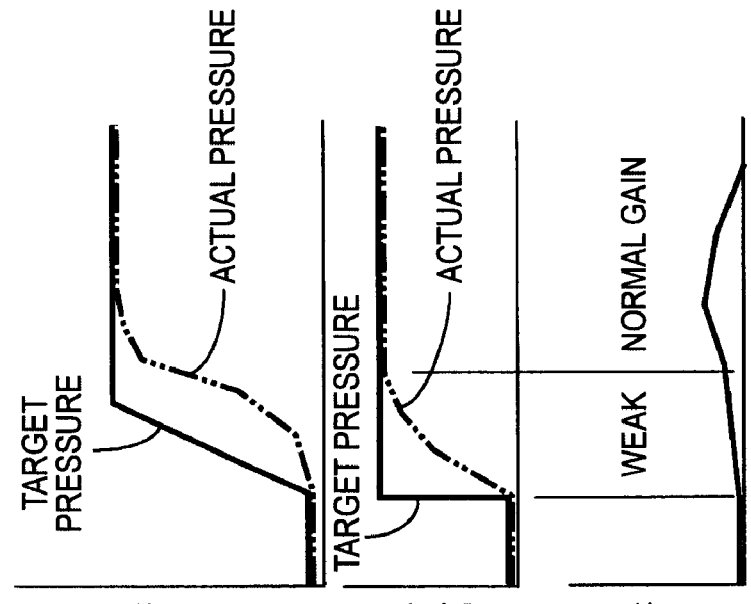
FIG. 11A is a diagrams which illustrate the follow-up capability of the actual pressure to the target pressure by a change in F/B gain of a regulator valve according to the present invention.
Figure 11B:
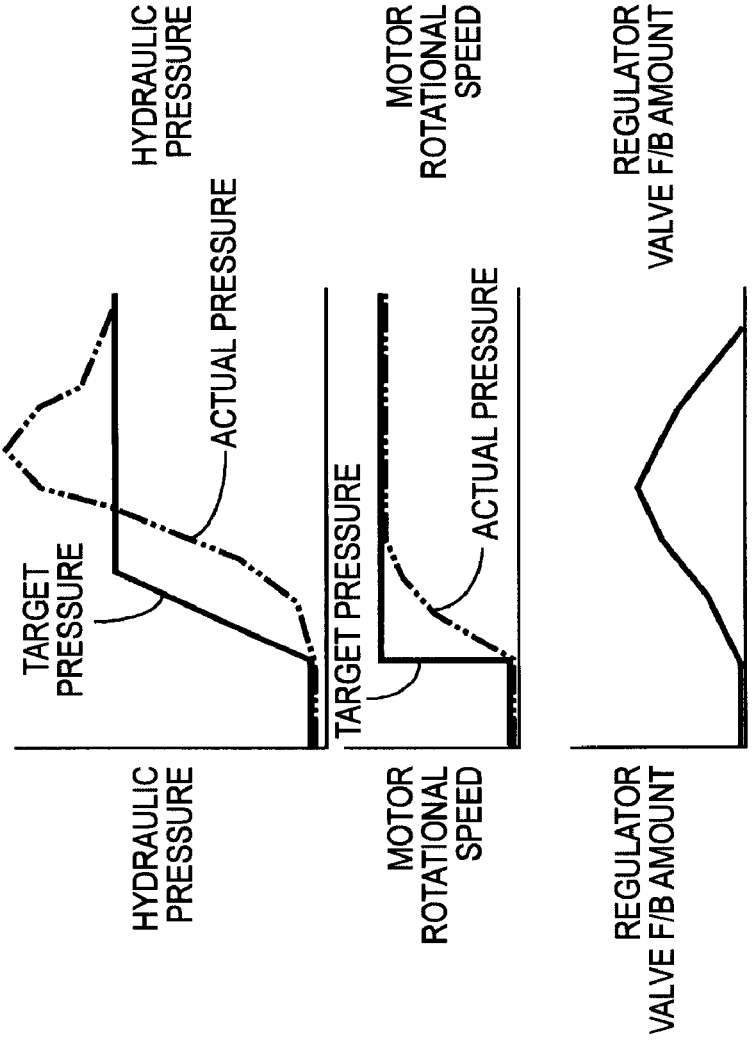
FIG. 11B is a diagrams which illustrate the follow-up capability of the actual pressure to the target pressure by a change in F/B gain of a regulator valve according to the conventional control.
Figure 12:
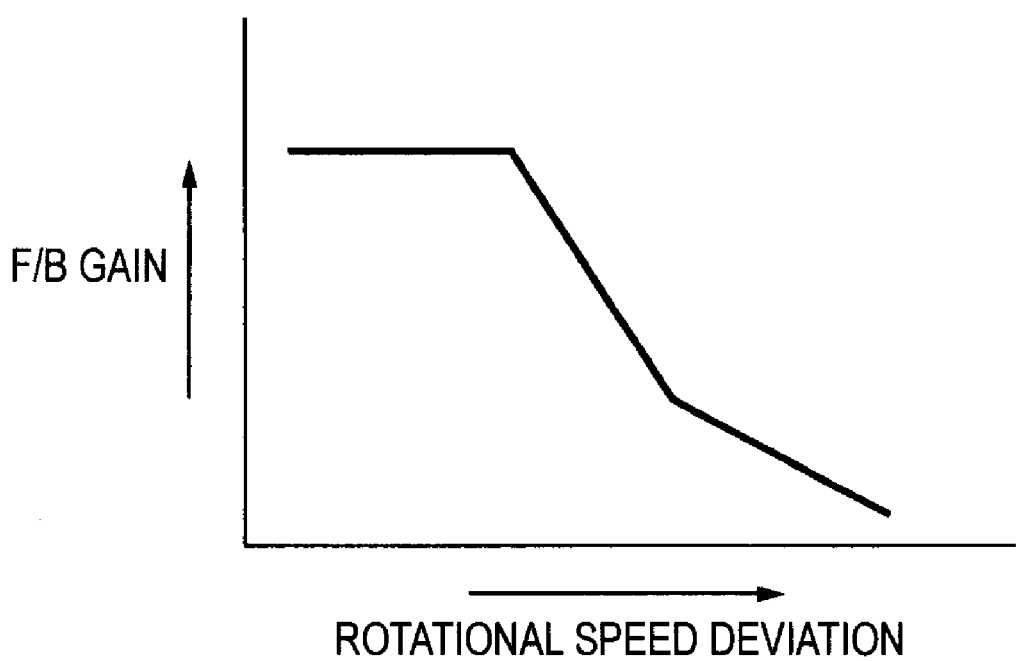
FIG. 12 is a diagram showing a change in F/B gain relative to a deviation in rotational speed.

Then, as shown in FIG. 2, the rotational speed deviation (the target rotational speed obtained in the target rotational speed calculation module 37—the actual motor rotational speed) which is obtained in the summing point 53 of the drive duty calculation unit 39 is inputted into the target current F/B term calculation module 48, and in the target current F/B term calculation module 48, as shown in FIG. 12, the F/B gain changes as the rotational speed deviation increases, whereby the F/B gain of the regulator valve 7 decreases as shown in FIG. 11(*a*) in an unnecessary portion, and even when the discharge amount of the pump 18 reaches the predetermined value, the generation of overshoot is suppressed.

Figure 13:
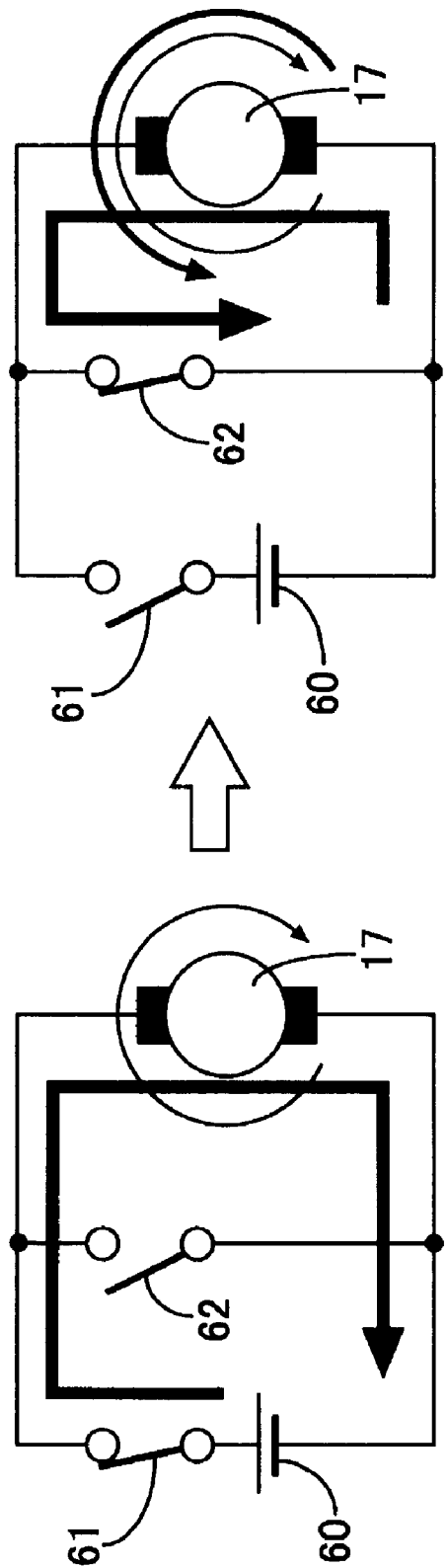
FIG. 13A is a diagram which illustrates a driving circuit of the electric motor.
FIG. 13B is a diagram which illustrates a driving circuit of the electric motor.

Although the rotational speed of the electric motor 17 changes freely as has been described above, in order for the rotational speed of the electric motor 17 to be allowed to change in an arbitrary manner in reality, both driving and braking of the electric motor 17 have to be controlled. In particular, although the braking side can be realized by implementing positive and negative controls by an H bridge or the like, there can be provided a large advantage even by only braking by an electric circuit as shown in FIG. 13. Namely, a series circuit made up of a battery 60 and a switch 61 is connected to both terminals of the electric motor 17, and a switch 62 for short-circuitting between both the terminals of the electric motor 17 is connected thereto in parallel to the series circuit. When the electric motor 17 is in operation, as shown in FIG. 13A, the switch 61 is closed to make the connection in the circuit, whereas the switch 62 is opened to break the connection, and when the electric motor 17 is braked, as shown in FIG. 13B, the switch 61 is opened to break the connection in the circuit, whereas the switch 62 is closed to make the connection, so that a motor brake state is obtained.

Figure 14:
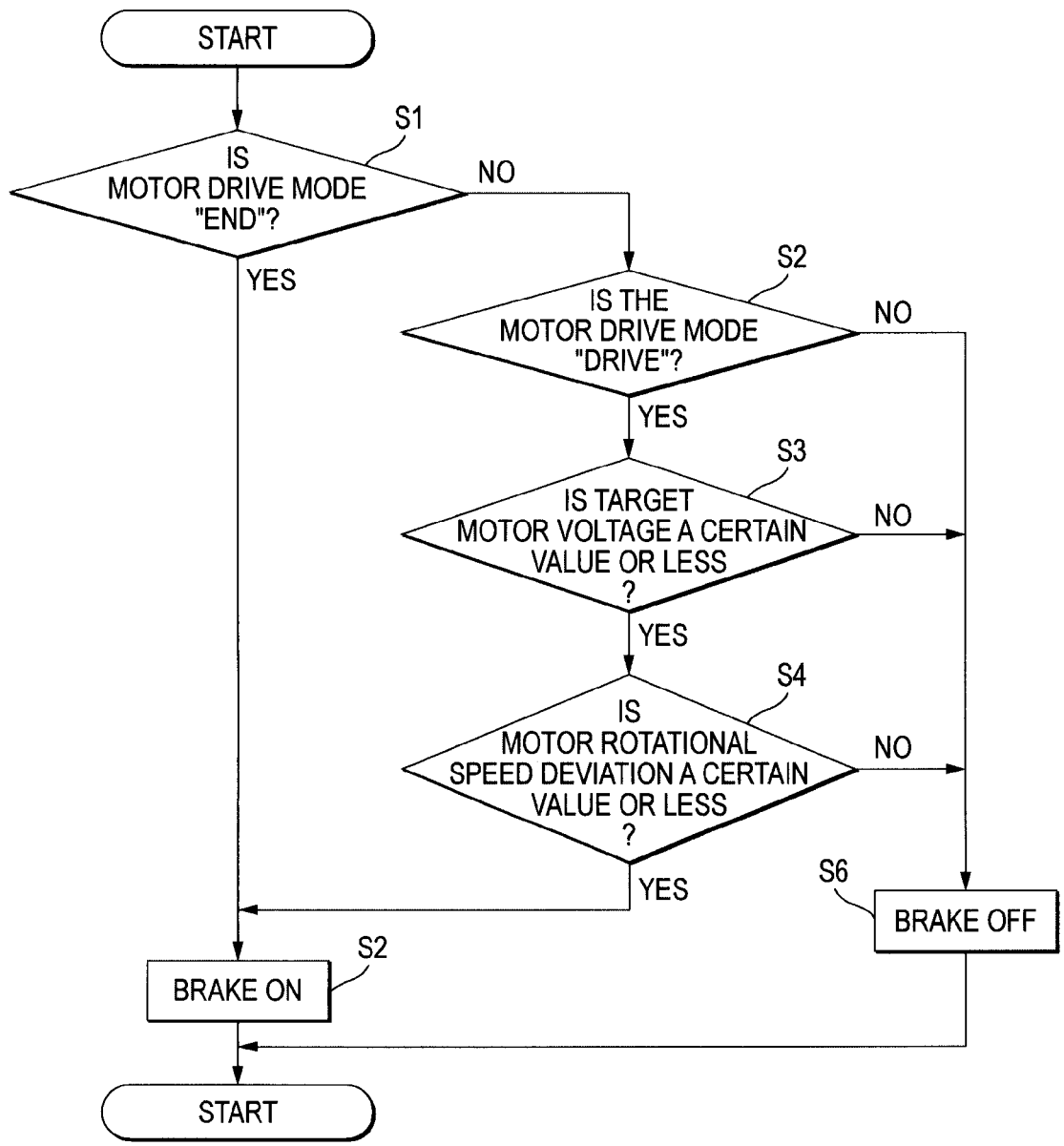
FIG. 14 is a flowchart which illustrates a control procedure of the electric motor.
Figure 16A:
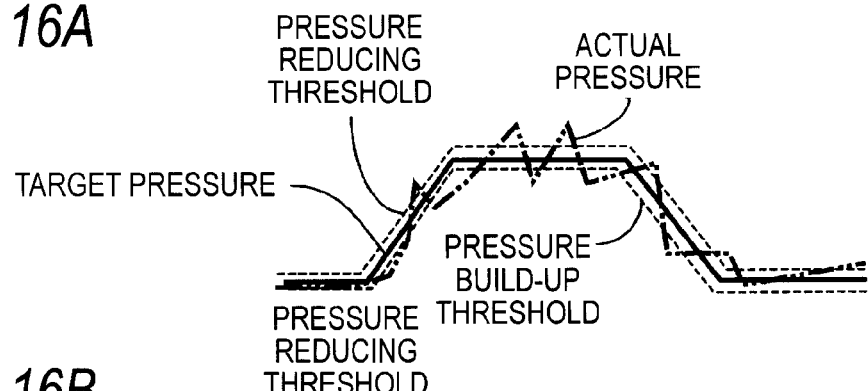
FIG. 16A is a timing chart which illustrate a problem inherent in a conventional control.
Figure 16B:
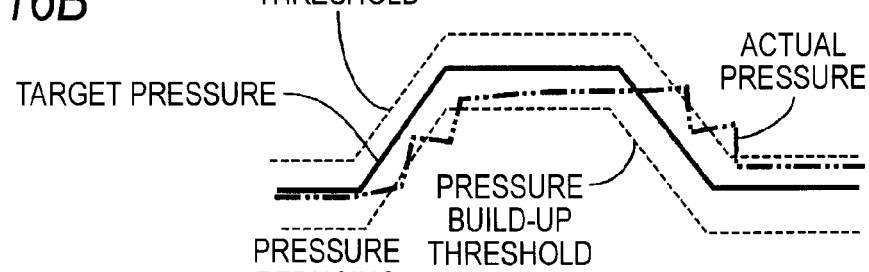
FIG. 16B is a timing chart which illustrate a problem inherent in a conventional control.
Figure 16C:
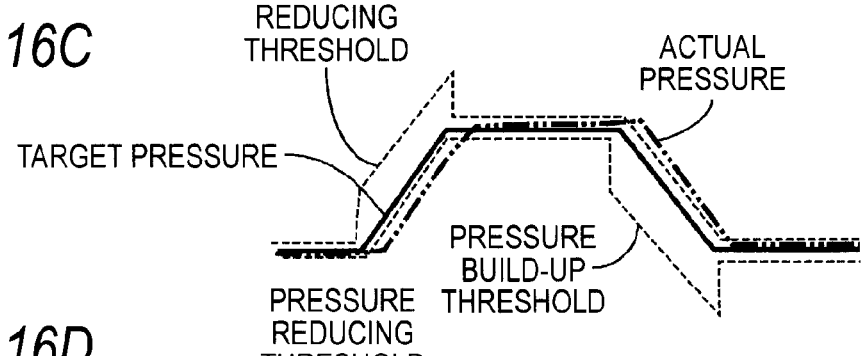
FIG. 16C is a timing chart which illustrate a problem inherent in a conventional control.
Figure 16D:
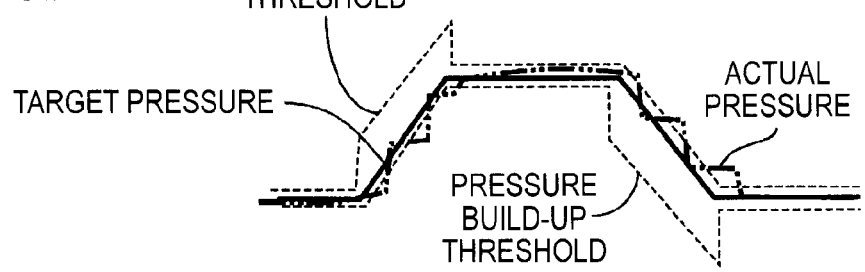
FIG. 16D is a timing chart which illustrate a problem inherent in a conventional control.

The implementation of the ON/OFF switching in this way without controlling the motor brake amount can be realized by adding a simple circuit, and an effective control of deceleration can be realized by implementing the ON/OFF switching according to a control procedure shown in FIG. 14.

In FIG. 14, at step S1, whether or not the drive control mode of the electric motor 17 is an end mode is determined. Here, as drive modes for the electric motor 17, there are set modes of "stop," "drive," and "end." The "end" mode denotes a state in which although there is no drive requirement, the electric motor 17 is rotating by virtue of inertia. Thus, if the end mode is confirmed at step S1, the flow of the procedure proceeds to step S2, where a brake-applied or brake-on state is produced.

If it is determined at step S1 that the drive control mode is not the end mode, the flow proceeds to step S3, where whether or not the drive control mode of the electric motor 17 is the drive mode is determined. If it is determined that the electric motor 17 is in the drive mode, then, whether or not the target motor voltage is a certain value or less is determined at step S4. If the target motor voltage is determined to be the certain value or less, then, whether or not the motor rotational speed deviation (the target rotational speed—the actual rotational speed) is a certain value or less is determined at step 5, and if the motor rotational speed deviation is the certain value of less, the flow proceeds from step S5 to step S2, where a brake-on state is produced.

In addition, if the drive control mode of the electric motor 17 is determined not to be the drive mode but to be the stop mode at step S3, the flow proceeds from step S3 to step S6, where a brake-on state is produced, and if it is determined at step S4 that although the drive control mode is the drive mode, the target motor voltage is exceeding a certain value, and if it is determined at step S5 that although the drive control mode is the drive mode with the target motor voltage being the certain value or less, the motor rotational speed deviation is exceeding the certain value, a brake-off state is produced at step S6.

According to the control procedure, as shown in FIG. 15, not only is the brake-on state produced when the drive control mode is the end mode, but also the brake-on state is produced even when the drive control mode is the drive mode with the target motor voltage being the certain value of less and the motor rotational speed deviation being the certain value or less (namely, with the actual rotational speed of the electric motor 17 exceeding the target rotational speed beyond a predetermined value), whereby the deceleration response is increased.

Next, the function of the embodiment will be described. Since the controller C obtains target flow rates for the respective disc brakes BA, BB, . . . in the target flow rate calculation unit 34 based on the target fluid amounts of the respective wheel disc brakes including the left front wheel disc brake BA and the right rear wheel disc brake BB which are obtained in the target fluid amount calculation module 31 and the actual fluid amounts of the respective disc brakes BA, BB, . . . which are obtained in the actual fluid amount calculation module 32 based on the hydraulic pressures detected in the brake hydraulic pressure detectors 23, 24 and controls the operation of the hydraulic pressure control unit 5 based on the target flow rates so obtained, the control accuracy and response in controlling the hydraulic pressures at the respective disc brakes BA, BB . . . can be enhanced.

Namely, the necessary response in controlling the hydraulic pressures at the respective disc brakes BA, BB . . . is the lamp response, and now that it is understood that while the lamps are in response, brake fluid continues to be inputted into or outputted from the wheel brakes, by controlling the hydraulic pressures at the wheel brakes based on such continuous input or output of brake fluid, the control accuracy and response can be enhanced.

In addition, since the controller C controls the operation of the hydraulic pressure control unit 5 by switching the operation control mode to the pressure build-up mode, the pressure reducing mode or the pressure holding mode based on the signs and absolute values of the target flow rates which are obtained in the target flow rate calculation unit 34, the actual hydraulic pressures can be changed in a linear manner with no direct reference to the magnitude of the actual and target hydraulic pressures, whereby the control accuracy can be made compatible with the response.

Moreover, since the current applied to the regulator valve 7, the inlet valves 9, 10 and the outlet valves 14, 15, which are the linear solenoid valves, in the hydraulic pressure control unit 5 is controlled based on the difference between the hydraulic pressures detected in the brake hydraulic pressure detectors 23, 24 and the target hydraulic pressures set in the target wheel brake pressure setting module 30 and the target flow rates obtained in the target flow rate calculation unit 34, the control currents can be obtained in association with changes in the characteristics of the regulator valve 7, the inlet valves 9, 10 and the outlet valves 14, 15 with flow rate, thereby making it possible to enhance the control performance.

In addition, since the controller C is made to include the target discharge amount calculation module 47 for obtaining a target discharge amount for the pump 18 based on the target flow rates obtained in the target flow rate calculation unit 34 and the target rotational speed calculation module 37 for obtaining a target rotational speed for the electric motor 17 which drives the pump 18 based on the target discharge amounts obtained in the target discharge amount calculation module 47 and controls the electric motor 17 based on the target rotational speed obtained in the target rotational speed calculation module 37, the response and quietness during the hydraulic pressure control can be enhanced and a further increase in hydraulic pressure control accuracy can be realized.

In addition, since the controller C includes the pressure build-up timer 57 adapted to implement counting up normally except when the count value is cleared to "0" when the hydraulic pressure control unit 5 is controlled to shift from the pressure build-up mode to the pressure reducing mode or to the pressure holding mode and the pressure reducing timer 58 adapted to implement counting up normally except when the count value is cleared to "0" when the hydraulic pressure control unit 5 is controlled to shift from the pressure reducing mode to the pressure build-up mode or to the pressure holding mode, and since the controlled variable of the regulator valve 7, the inlet valves 9, 10 or the outlet valves 14, 15 in the hydraulic control unit 5 are made to increase as the high select value TM_MDCAL which results by high selecting the count values of the pressure build-up timer 57 and the pressure reducing timer 58 by the high select module 59 increases, the generation of control hunting can be prevented.

Additionally, although the controller C controls the electric motor 17 so that the actual motor rotational speed detected by the motor rotational speed detecting module 29 becomes the target rotational speed operated in the target rotational speed calculation module 37, the F/B gain which controls the regulator valve 7 changes in such a manner as to decrease as the rotational speed deviation (the target rotational speed—the actual motor rotational speed) increases, whereby the generation of overshoot can be suppressed even when the discharge amount of the pump 18 reaches the predetermined value at the initial stage of the control.

Furthermore, since the series circuit made up of the battery 60 and the switch 61 is connected to both the terminals of the electric motor 17 and the switch 62 for short-circuitting between both the terminals of the electric motor 17 is connected thereto in parallel to the series circuit, and since the controller C causes the switch 62 to be closed to make the connection in the circuit so as to short-circuit between both the terminals of the electric motor 17 when the target motor voltage is the certain value of less even in such a state that the electric motor 17 is being driven and the actual rotational speed of the electric motor 17 exceeds the target rotational speed beyond the predetermined value, the deceleration response of the electric motor 17 can be increased with the simple drive circuit.

Thus, while the embodiment of the invention has been described heretofore, it should be understood that the invention is not limited thereto but can be modified variously with respect to the design thereof without departing from the spirit and scope of the invention which are described in the claims thereof.

What is claimed is:

1. A vehicle brake hydraulic pressure control system, comprising:
   a hydraulic pressure supply source (M, 18) which outputs hydraulic pressure;
   a hydraulic pressure control unit (5) which is interposed between the hydraulic pressure supply source (M, 18) and wheel brakes (BA, BB) and which adjusts hydraulic pressures at the wheel brakes (BA, BB);
   a brake hydraulic pressure detecting unit which detects hydraulic pressures at the wheel brakes (BA, BB); and
   a controller (C) which comprises a target wheel brake pressure setting unit (30) which sets target hydraulic pressures for the wheel brakes (BA, BB) and which controls an operation of the hydraulic pressure control unit (5) so that the hydraulic pressures at the wheel brakes (BA, BB) become target hydraulic pressures set by the target wheel brake pressure setting unit (30),
   wherein the controller (C) comprises:
      a target fluid amount calculation unit (31) which obtains target fluid amounts for the wheel brakes (BA, BB) based on the target hydraulic pressures set by the target wheel brake pressure setting unit (30);
      an actual fluid amount calculation unit (32) which obtains actual fluid amounts for the wheel brakes (BA, BB) based on the hydraulic pressures detected by the brake hydraulic pressure detecting unit (23, 24),
      a target flow rate calculation unit (34) which obtains target flow rates for the wheel brakes (BA, BB) based on the target fluid amounts obtained by the target fluid amounts calculation unit (31) and the actual fluid amounts obtained by the actual fluid amount calculation unit (32), wherein the controller controls the operation of the hydraulic pressure control unit (5) based on the target flow rates obtained by the target flow rate calculation unit (34),
      a pressure build-up timer (57) which implements counting up normally except when a count value is cleared to "0" where the hydraulic pressure control unit (5) is controlled to shift from a pressure build-up mode in which the hydraulic pressure of the hydraulic pressure supply source (M, 18) is applied to the wheel brakes (BA, BB) to a pressure reducing mode in which the hydraulic pressures are released at the wheel brakes (BA, BB) or a pressure holding mode in which the hydraulic pressures at the wheel brakes (BA, BB) are held; and
      a pressure reducing timer (58) which implements counting up normally except when a count value is cleared to "0" when the hydraulic pressure control unit (5) is controlled to shift from the pressure reducing mode to the pressure build-up mode or the pressure holding mode, and
   the controller (C) increases a controlled variable of the hydraulic pressure control unit (5) as a high select value of the count values of the pressure build-up timer (57) and the pressure reducing timer (58) increases.

2. The vehicle brake hydraulic pressure control system as set forth in claim 1, wherein the controller (C) controls the operation of the hydraulic pressure control unit (5) by switching the operation mode thereof among the pressure build-up mode, the pressure reducing mode and the pressure holding mode based on signs and absolute values of the target flow rates obtained by the target flow rate calculation unit (34).

3. The vehicle brake hydraulic pressure control system as set forth in claim 1, wherein the hydraulic pressure control unit (5) comprises linear solenoid valves (7, 9, 10, 14, 15) which are current controlled, and the control unit (C) controls current applied to the linear solenoid valves (7, 9, 10, 14, 15) based on a difference between the hydraulic pressures detected by the brake hydraulic pressure detecting unit (23, 24) and the target hydraulic pressures set by the target brake pressure setting unit (30) and the target flow rate obtained by the target flow rate calculation unit (34).

4. The vehicle brake hydraulic pressure control system as set forth in claim 1, wherein the hydraulic pressure supply source (18) is a pump which is driven by an electric motor (17), and the controller (C) comprises:
 a target discharge amount calculation unit (47) which obtains a target discharge amount for the pump (18) based on the target flow rates obtained by the target flow rate calculation unit (34); and
 a target rotational speed calculation unit (37) which obtains a target rotational speed for the electric motor (17) based on the target discharge amount obtained by the target discharge amount calculation unit (47) and the controller (C) controls the electric motor (17) based on the target rotational speed obtained by the target rotational speed calculation unit (37).

5. A method of controlling a vehicle brake hydraulic pressure system, comprising:

outputting hydraulic pressure from a hydraulic pressure supply source (M, 18);

adjusting hydraulic pressures at wheel brakes (BA, BB) with a hydraulic pressure control unit (5) which is interposed between the hydraulic pressure supply source (M, 18) and the wheel brakes (BA, BB);

detecting hydraulic pressures at the wheel brakes (BA, BB) with a brake hydraulic pressure detecting unit;

setting target hydraulic pressures for the wheel brakes (BA, BB) with a target wheel brake pressure setting unit (30);

controlling an operation of the hydraulic pressure control unit (5) so that the hydraulic pressures at the wheel brakes (BA, BB) become target hydraulic pressures set by the target wheel brake pressure setting unit (30), obtaining target fluid amounts for the wheel brakes (BA, BB) with a target fluid amount calculation unit (31) based on the target hydraulic pressures set by the target wheel brake pressure setting unit (30);

obtaining actual fluid amounts for the wheel brakes (BA, BB) with an actual fluid amount calculation unit (32) based on the hydraulic pressures detected by the brake hydraulic pressure detecting unit (23, 24);

obtaining target flow rates for the wheel brakes (BA, BB) with a target flow rate calculation unit (34) based on the target fluid amounts obtained by the target fluid amounts calculation unit (31) and the actual fluid amounts obtained by the actual fluid amount calculation unit (32);

controlling the operation of the hydraulic pressure control unit (5) based on the target flow rates obtained by the target flow rate calculation unit (34);

applying the hydraulic pressure of the hydraulic pressure supply source (M, 18) to the wheel brakes (BA, BB) during a pressure build-up mode;

releasing the hydraulic pressures at the wheel brakes (BA, BB) during a pressure reducing mode; and holding the hydraulic pressures at the wheel brakes (BA, BB) during a pressure holding mode;

switching between the pressure build-up mode, the pressure reducing mode and the pressure holding mode based on signs and absolute values of the target flow rates obtained by the target flow rate calculation unit (34).

6. The method of controlling a vehicle brake hydraulic pressure system as set forth in claim 5, further comprising:

providing linear solenoid valves (7, 9, 10, 14, 15) which are current controlled, and controlling current applied to the linear solenoid valves (7, 9, 10, 14, 15) based on a difference between the hydraulic pressures detected by the brake hydraulic pressure detecting unit (23, 24) and the target hydraulic pressures set by the target brake pressure setting unit (30) and the target flow rate obtained by the target flow rate calculation unit (34).

7. The method of controlling a vehicle brake hydraulic pressure system as set forth in claim 5, further comprising:

obtaining a target discharge amount for the hydraulic pressure supply source (18) with a target discharge amount calculation unit (47) based on the target flow rates obtained by the target flow rate calculation unit (34), wherein the hydraulic pressure supply source (18) is a pump which is driven by an electric motor (17);

obtaining a target rotational speed for the electric motor (17) with a target rotational speed calculation unit (37) based on the target discharge amount obtained by the target discharge amount calculation unit (47); and controlling the electric motor (17) based on the target rotational speed obtained by the target rotational speed calculation unit (37).

* * * * *